(12) United States Patent
Ten Eyck (10) Patent No.: US 6,798,968 B2
(45) Date of Patent: Sep. 28, 2004

(54) FIBER ARRAY WITH SUPPORT POST

(75) Inventor: Gregory A. Ten Eyck, Blacksburg, VA (US)

(73) Assignee: Shipley Company, L.L.C., Marlborough, MA (US)

(*) Notice: Subject to any disclaimer, the term of this patent is extended or adjusted under 35 U.S.C. 154(b) by 173 days.

(21) Appl. No.: 09/957,755

(22) Filed: Sep. 21, 2001

(65) Prior Publication Data

US 2002/0051618 A1 May 2, 2002

Related U.S. Application Data

(60) Provisional application No. 60/234,430, filed on Sep. 21, 2000.

(51) Int. Cl.[7] .................................................. G02B 6/00
(52) U.S. Cl. ....................................................... 385/137
(58) Field of Search ............................ 385/137, 65, 83, 385/88, 89, 92, 49

(56) References Cited

U.S. PATENT DOCUMENTS

| | | | |
|---|---|---|---|
| 4,880,494 A | * 11/1989 | Kaukeinen et al. | ......... 156/633 |
| 4,911,526 A | 3/1990 | Hsu et al. | |
| 4,973,127 A | 11/1990 | Cannon, Jr. et al. | |
| 5,006,201 A | 4/1991 | Kaukeinen | |
| 5,185,825 A | 2/1993 | Shigematsu et al. | |
| 5,315,678 A | 5/1994 | Maekawa et al. | |
| 5,379,360 A | 1/1995 | Ota et al. | |
| 5,446,815 A | 8/1995 | Ota et al. | |
| 5,482,585 A | 1/1996 | Ota et al. | |
| 5,548,673 A | 8/1996 | Kitamura et al. | |
| 5,566,262 A | 10/1996 | Yamane et al. | |
| 5,689,599 A | * 11/1997 | Shahid | ........................ 385/83 |
| 5,719,978 A | 2/1998 | Kakii et al. | |
| 5,764,833 A | 6/1998 | Kakii et al. | |
| 5,778,123 A | 7/1998 | Hagan et al. | |
| 5,815,621 A | 9/1998 | Sakai et al. | |
| 5,984,534 A | 11/1999 | Elderstig et al. | |
| 6,027,253 A | 2/2000 | Ota et al. | |
| 6,045,270 A | 4/2000 | Weiss et al. | |
| 6,103,344 A | 8/2000 | Ota et al. | |
| 6,160,947 A | 12/2000 | Osugi et al. | |
| 6,195,495 B1 | 2/2001 | Ota et al. | |
| 6,215,944 B1 | 4/2001 | Ota et al. | |
| 6,215,945 B1 | 4/2001 | Fukuyama et al. | |
| 6,328,479 B1 | 12/2001 | Schofield et al. | |

FOREIGN PATENT DOCUMENTS

JP          63-301005     * 12/1988

* cited by examiner

Primary Examiner—Khiem Nguyen
(74) Attorney, Agent, or Firm—Niels Haun; Jonathan D. Baskin (57) ABSTRACT

A fiber array is provided for use in optical systems requiring a one-dimensional or two-dimensional array of fibers. The fiber array includes a support post disposed within a fiber-containing cavity of the fiber array to provide support within the internal cavity. The use of the support post permits the height of the fiber array to be reduced thereby enabling such fiber arrays to be stacked together more closely providing increased fiber packing density among arrays. In addition, the fiber array is configured to support and protect un-jacketed fibers, where the absence of the jacket permits increased packing density among fibers in an individual fiber array.

61 Claims, 7 Drawing Sheets

FIBER ARRAY WITH SUPPORT POST

Applicants claim the benefit of priority of U.S. Provisional Application No. 60/234,430, filed on Sep. 21, 2000, the entire contents of which are incorporated herein by reference.

FIELD OF THE INVENTION

The present invention relates generally to a fiber array, and more particularly to a fiber array comprising a support post that permits the fiber array to be fabricated with reduced thickness.

BACKGROUND OF THE INVENTION

Use of multiple optical channels has become prevalent in applications ranging from data communications to optical imaging in response to a need for increased system bandwidth. At the same time, miniaturization still remains an important goal in these applications. High fiber packing density assists in effecting miniaturization and increasing the space-bandwidth product. In addition, integration of components is an important engineering design principle in many applications. Integration of components effectively decreases the number of parts, which decreases the number of degrees of freedom among components, thereby simplifying product assembly.

In many of these systems, multiple optical channels take the form of optical fibers which communicate with other devices or other fibers of the system. A fiber array provides a desirable way for handling multiple optical fibers while attempting to effect miniaturization, decrease the degrees of freedom among the fibers, and increase the packing density of the fibers.

Typically, a fiber includes an inner core and cladding enclosed within an outer jacket. For maximizing packing density, only the information carrying portions of the fiber need be accessible at the input and output portions of an array. Thus, only the core and surrounding cladding of a fiber need to be accessible at the input and output of the array. The jacket, which typically surrounds the cladding, provides structural support for the core and cladding but performs no optical function. For example, a fiber may have a jacket diameter of 250 microns and cladding diameter of 125 microns. Therefore, the removal of the jacket permits an increase in the linear packing density by a factor of 2.

In certain applications it becomes highly desirable to stack linear fiber arrays to create a two-dimensional array of optical fibers. In order to maximize packing efficiency in a two-dimensional array, high fiber packing density must be achieved in both directions of the two-dimensional array. One way to effect a higher packing density is to minimize the dimensions of the fiber array. To this end, it is desirable to provide a fiber array to precisely hold un-jacketed fiber segments and provide structural support to those segments. However, providing that support requires that the fiber array be sufficiently rigid itself, which in turn places limits on minimum acceptable dimensions of the entire array.

SUMMARY OF THE INVENTION

In accordance with the present invention, a fiber array is provided having a reduced dimension, such as height, made possible through the use of one or more support posts in an open cavity of the fiber array.

In general, a basechip is provided for use in the support of an array of optical fibers. The optical fibers may be of the type having a large-width section of a predetermined width and an adjoining small-width section of relatively smaller width. A grooved support section is provided on the basechip having a series of longitudinally extending grooves dimensioned to receive the small width sections of the fibers and to hold the small width sections between the basechip and a mating enclosing lidchip. An enlarged recessed area adjoins the grooved support section and is dimensioned to receive the large-width sections of the optical fibers to hold the large width sections between the basechip and the enclosing lidchip. A support post is disposed within the recessed area to provide support within the recessed area relative to the basechip and the lidchip. The support post provides passageway channels within the recessed area on opposite sides of the support post for holding the large-width sections of the optical fibers.

The lidchip may be combined with the basechip to provide a support structure for the array of optical fibers. The lidchip may include a recessed area that can be positioned in registry with the recessed area of the basechip to form a fiber holding cavity for holding the large-width sections of the optical fibers. In a second embodiment, the support post may include a first support post section positioned within the recessed area of the basechip and a second support post section positioned within the recessed area of the lidchip to form a unified support post within the cavity when the lidchip is closed on the basechip. The lidchip may include a mating surface for enclosing the grooves on the basechip. Alternatively, the lidchip may include a grooved section providing a series of grooves dimensioned to register with the grooves on the basechip to form fiber holding channels for supporting and holding the small-width sections of the optical fibers. In application, the large-width sections of the optical fibers may include jacketed segments of optical fibers and the small-width sections may include un-jacketed sections of the optical fibers. The un-jacketed sections of the optical fibers may be enclosed within a cladding having a smaller outside diameter than the jacketed segments of the optical fibers.

In an alternate embodiment, basechip support is provided for a fiber array having a front face and a rear face. A top mating surface is provided on the basechip having a plurality of grooves formed therein. The grooves extend along a longitudinal axis and have first and second open ends. The first open ends of the grooves are positioned proximate to the front face of the basechip. A first recessed area extends downward into the basechip from the mating surface in deeper distance than that of the grooves. The recessed area is formed by a base surface recessed below the mating surface. The recessed area includes a first transverse sidewall positioned at the second open ends of the longitudinal grooves. Second and third side walls extend longitudinally from the first transverse side wall to the rear face of the basechip. The base surface adjoins the lower edges of the first, second and third side walls. At least one support post extends upwardly from the base surface within the recessed area toward the mating surface. The support post has an upper support surface for engaging a mating enclosure structure for providing support within the recessed area.

In a more specific configuration, the fiber array of the present invention includes front and back face walls, the back face wall having a fiber receiving opening. A top wall extends from a top edge of the first face wall to a top edge of the back face wall to form an upper surface of the fiber array. Similarly, a bottom wall extends from a bottom edge of the front face wall to a bottom edge of the back face wall to form a lower surface of the fiber array. A fiber receiving cavity is disposed vertically between the upper and lower surfaces of the fiber array and communicates with the fiber receiving opening in the back face wall. The cavity comprises top and bottom interior walls disposed proximate to the respective top and bottom walls of the fiber array. A plurality of passageways are provided for receiving and holding optical fibers. The passageways have first passageway ends disposed at the front face wall to communicate with the exterior of the fiber array. The passageways have opposing second passageway ends disposed in communication with the fiber receiving cavity, and thus the passageways extend from the first end wall to the fiber receiving cavity. A support post is disposed within the fiber receiving cavity and extends from the bottom interior wall to the top interior wall. A plurality of optical fibers, having a central core surrounded by a cladding covered by a jacket, are disposed within the fiber array. The fibers have an unjacketed core segment from which the jacket has been removed from a first end of the optical fibers. The un-jacketed core segment of the optical fibers is disposed within the passageways with the first end of the optical fibers located proximate to the front face wall of the fiber array. The fibers also have a jacketed segment adjoining the un-jacketed core segment from which the jacket has not been removed. The jacketed segment of the optical fiber is contained within the fiber receiving cavity. The support structure for a fiber array may be created from a separate basechip and lidchip.

A basechip is formed to have a first mating surface in which a plurality of longitudinally extending grooves are formed. The grooves extend along a longitudinal axis and have first and second open ends. The first open ends of the grooves are located proximate to a front face of the basechip. A first recessed area extends into the basechip from the first mating surface. The first recessed area includes a first sidewall extending transverse to the longitudinal grooves. The first sidewall is positioned to adjoin the second open ends of the grooves. The first recessed area also includes second and third sidewalls which extend generally longitudinally away from the first sidewall. A base is provided for the recessed area that adjoins the first, second, and third sidewalls. The basechip includes at least one support post which extends upwardly from the base intermediate the second and third sidewalls and has an upper support surface located generally in the plane containing the first mating surface. A complementary lidchip is formed for combination with the basechip to create the fiber array support structure.

The lidchip comprises a second mating surface which is substantially in facing contact with the first mating surface of the basechip. A complementary recessed area extends into the lidchip and has a base wall that provides the bottom of the complementary recessed area. The complementary recessed area is positioned in registry with the first recessed area to form a fiber holding cavity. The lidchip may include at least one complementary support post which extends from the base wall of the lidchip. The complimentary support post has a mating support surface located proximate to a plane containing the second mating surface. The mating support surface is positionable in substantially facing contact with the upper support surface of the support post of the basechip to form a support post through the fiber holding cavity. Within the combined structure of the basechip and lidchip, a plurality of optical fibers are held. The fibers have an un-jacketed core segment and an adjoining jacketed segment. The un-jacketed core segments of the optical fibers are disposed within the grooves of the basechip, whereas the jacketed segments of the optical fibers are disposed within the fiber holding cavity formed by the conjoined recessed areas of the lidchip and the basechip. In addition, the lidchip may optionally include complementary grooves in the second mating surface located for registry with the grooves of the basechip to form elongated channels for receiving and holding the un-jacketed core segments.

The fiber array of the present invention, through use of the support post, permits the array to have a reduced height by enabling reduction in the thickness between the upper surface of the fiber array and the top interior wall. The support post likewise permits a decrease in the thickness between the lower surface of the fiber array and the bottom interior wall of the fiber array.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Referring to the Figures, the present invention provides a fiber array, generally designated 10, having a basechip 12 and a lidchip 112 which can be closed together to retain a plurality of optical fibers 46 in a configuration that permits access to the cores of the optical fibers 46 while minimizing the volume occupied by the fiber array 10. Minimizing the size of the fiber array 10 enables a greater packing density of fiber arrays and hence a greater packing density of optical fibers. One feature which enables the size to be minimized is a support post 28 disposed within a recessed area 18 which holds the optical fibers 46. The use of a support post 28 provides added structural support to the array 10 thereby permitting portions of the array to be made thinner than otherwise possible, which in turn decreases at least one selected dimension, such as the overall height, of the fiber array 10.

Figure 1:
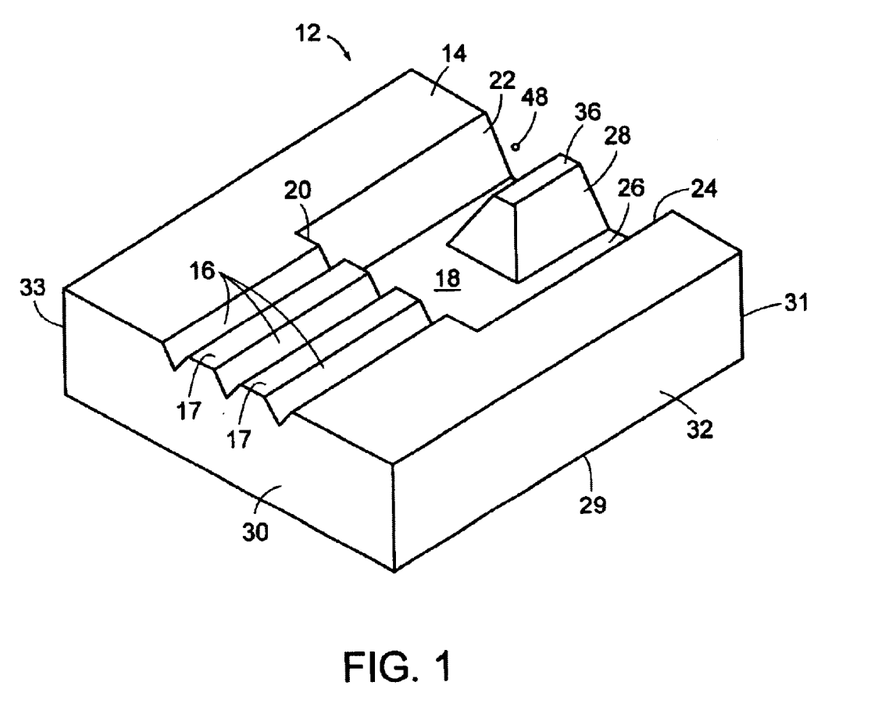
FIG. 1 schematically illustrates a perspective view of a basechip having a recessed area and grooves for retaining jacketed and un-jacketed fiber segments respectively.

In particular, with reference to FIG. 1, there is shown a basechip 12 from which the fiber array may be assembled. The basechip 12 is illustrated as having an overall generally rectangular solid shape in which specific features are formed. Although the shape is depicted as a rectangular solid other shapes may be utilized. As depicted in FIG. 1, the basechip 12 includes an upper surface providing a mating surface 14 for registry with lidchip 112 and a bottom surface 29, a front face 30 and a rear face 31, and, a right sidewall 32 and a left sidewall 33, which are formed in the shape of a rectangular parallelepiped.

Figure 2:
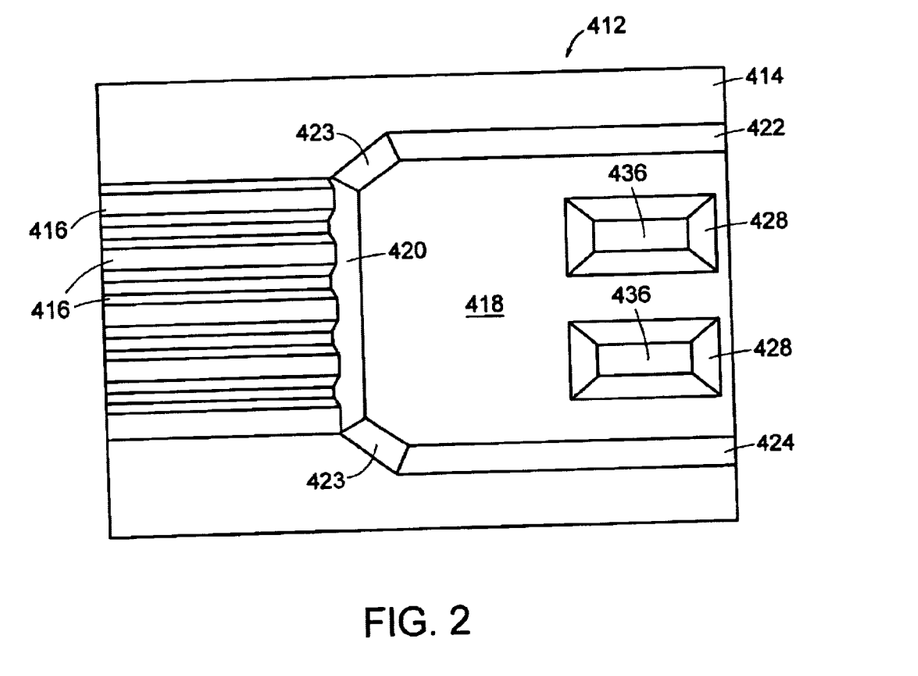
FIG. 2 schematically illustrates a top view of a basechip having an alternative arrangement of fiber grooves and support posts.

A plurality of grooves 16 are formed in the mating surface 14 as a series of generally parallel grooves having first open ends located at the front face 30 that communicate with the exterior of the basechip 12. The grooves 16 extend along a longitudinal axis into the interior of basechip 12 where the grooves 16 terminate at second open ends that communicate with a recessed area 18. The grooves 16 are spaced apart from each other in the transverse direction at a predetermined pitch. As shown in FIG. 1, the grooves 16 may be spaced apart a predetermined distance so that flat surfaces 17 of the mating surface 14 are formed intermediate the longitudinally extending grooves 16. The grooves 16 may have sidewalls that are inclined with respect to the plane of the mating surface 14. For example, the grooves may have a V-shaped cross section as depicted in FIG. 1 or may have other shapes suitable for retaining the clad cores of the optical fibers 46. Such shapes may include, for example, a U-shaped cross section, as shown in FIG. 2.

Figure 4:
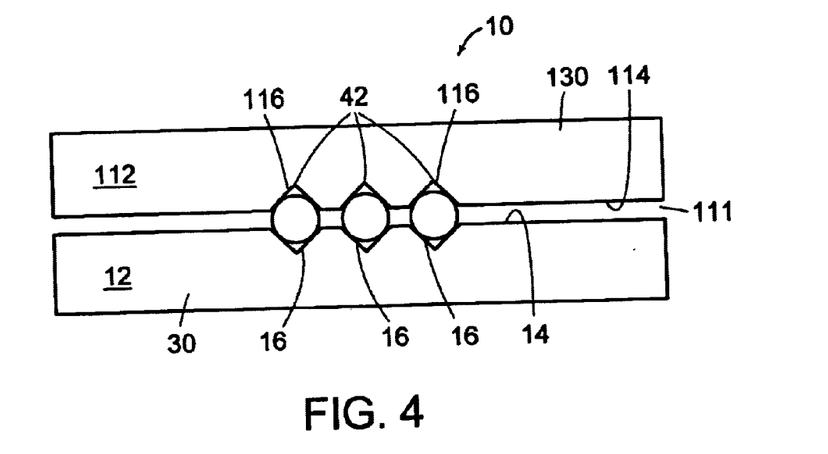
FIG. 4 schematically illustrates an end elevational view of the front faces of the joined chips of FIG. 3.

The optical fibers 46, as described herein, have a central optical core surrounded by a cladding 42 which is covered by a jacket 44. The grooves 16 are dimensioned to enable an un-jacketed segment of the optical fibers to be held in place by the grooves 16 when a lidchip 112 is closed onto the basechip 12, as best seen in FIG. 4. The depth of the grooves 16 and width of the grooves 16 in the transverse direction may be selected to ensure two-point contact between the cladding 42 and the grooves 16 as well as contact with the lidchip 112, as shown in FIG. 4. The two-point contact grooves 16 of the basechip 12 and contact with the lidchip 112 facilitates precise location of the fibers within the grooves 16, which creates improved registration among the locations of the fibers in the grooves 16. A gap 111 between the basechip 12 and lidchip 112 may be provided to ensure that the fibers engage both the basechip 12 and lidchip 112. Such a gap 111 may be 5 to 20 microns, for example, to retain an adhesive for bonding the basechip 12 to the lidchip 112. The grooves 16 may be spaced apart at a selected distance as shown in FIG. 4, which may be as close together as permitted by the fabrication method in order to maximize the fiber packing density linearly across the width of the array.

For holding jacketed portions of the fibers 46, a recessed area 18 extends deeper into the basechip 12 than channels 16 terminating at a base 26 oriented generally parallel to the mating surface 14. In the embodiment of FIG. 1, the perimeter of recessed area 18 is defined by a first sidewall 20 oriented along an axis parallel to the front face and second and third sidewalls 22, 24, which abut the first sidewall 20 and extend away from the first sidewall 20 generally along the direction of the longitudinal axis of the grooves 16 to the rear face of the basechip 12. The first sidewall 20 is located at and adjoins the open ends of the grooves 16. The first, second, and third sidewalls 20, 22, 24 abut the base 26 along respective lower edges of the first, second, and third sidewalls 20, 22, 24. Most generally, the second and third sidewalls 22, 24 need not adjoin the first sidewall 20. Alternatively, as depicted in FIG. 2, angled sidewalls 423 may be disposed between the second and third sidewalls 422, 424 and the first sidewall 420. The recessed area 18 communicates with the exterior of the fiber array 10 through a fiber receiving opening 48 disposed in the rear face of the fiber array 10. The fiber receiving opening 48 is disposed generally opposite the first sidewall 20. The region between the base 26 and the bottom surface 29 of the basechip 12 defines a thin wall 34, as best seen in FIG. 5, which may be made thinner when a support post 28 or additional separate support posts are disposed on the base 26 with the recessed area 18 to provide structural support to the thin wall 34 when the lidchip 112 is closed onto the basechip 12.

More specifically, as shown in FIG. 1, the support post 28 is disposed within the recessed area 18 and extends upward from the base 26 towards the mating surface 14 terminating in an upper support surface 36. The support post 28 is generally in the form of a truncated pyramid having elongated flat top surface providing said upper support surface 36. The support post 28 may have a different shape that provides mechanical support. The support post 28 is oriented in the longitudinal direction in order to minimize the width of the support post 28 to provide reduced blockage of the clearance across the width of the recessed area 18, so that high packing density across the width of the fiber array 10 can be effected. In general, the upper support surface 36 maybe located proximate to or in the plane containing the first mating surface 14 or, alternatively, may project above or lie below such plane.

Figure 5:
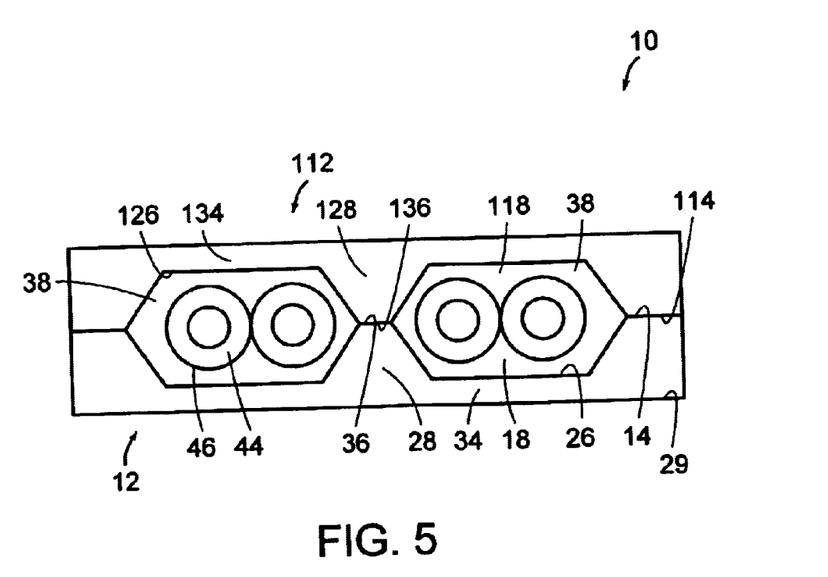
FIG. 5 schematically illustrates an end elevational view of the joined chips of FIG. 3 showing the recessed areas of the chips at the rear faces of the joined chips.

In one particular configuration, as shown in FIGS. 1 and 5, the upper support surface 36 is substantially parallel to the plane of the first mating surface 14. The support post 28 may be dimensioned so that the upper support surface 36 is capable of mating with a complementary surface 136 of the lidchip 112 at a position within the lidchip 112 to span the height of the recessed area 18 of the basechip 12 and any mating open area within the lidchip 112, thus providing a support structure in the recessed area 18. The upper support surface 36 of the support post 28 may be planar or have another shape capable of mating with the complementary surface of the lidchip 112. The support post 28 is disposed proximate to the fiber receiving opening 48 of the basechip 12 to permit the jacketed fibers 46 to be bent around the support post 28. Additional support posts may be desirable especially for wider arrays, such as arrays containing 36 to 48 or more fibers.

The recessed area 18 has a selected width measured along a direction perpendicular to the longitudinal axis of the fibers and within the plane of the mating surface 14 to hold a predetermined number of optical fibers. The width of the recessed area 18 is sufficiently large to accommodate the support post 28 and a predetermined number of jacketed optical fibers 46 equivalent to the number of grooves 16. The recessed area 18 has a length measured along the longitudinal axis of the grooves 16 extending from the first sidewall 20 to the rear wall of the basechip 12. Similarly, the support post 28 has a length measured along the longitudinal axis. The length of the recessed area 18 and length of the support post 28 are chosen such that the support post 28 is sufficiently far away from the first sidewall 20 to permit jacketed fibers 46 to bend around the support post 28 and deliver the un-jacketed clad core of the fibers 46 in registry with the grooves 16. Such bending is required for the configuration where the grooves 16 are spaced at a pitch less than the diameter of the jacketed fibers 46 as shown in FIG. 4, for example. It may also be desirable to position the support post 28 as close as possible to the first sidewall 20 to minimize the overall length of the fiber array 10, while still permitting the bending of the jacketed fibers 46 laterally about the support post 28. The length and width of the support post 28 may be dimensioned as small as possible to minimize the overall size of the fiber array 10 but without sacrificing structural support.

The recessed area 18 has a height measured perpendicularly from the base 26 to the plane of mating surface 14. The height of the recessed area 18 is dimensioned to permit jacketed fibers 46 to be held in place between the basechip 12 and the lidchip 112. The height of the recessed area 18 may be of a selected size, such as at least one-half of the diameter of the fiber jacket 44, with suitable or mating clearance being provided in the mating lidchip 112 to enclose and hold the fibers 46 in place as shown in FIG. 5. For example, a typical height of the recessed area 18 may be 125 microns, corresponding to a fiber 46 having a jacket diameter of 250 microns.

The basechip 12 may be formed of suitable materials having sufficient structural strength and in which features having the above described dimensions can be formed. For example, one particularly suited material is single crystal Si which may be etched by isotropic or anisotropic processes to form the grooves 16 and the recessed area 18 having the support post 28. In particular, grooves 16 having a V-shaped or U-shaped cross section may be formed by etching of <100>-oriented silicon through a mask with a solution of potassium hydroxide. Such an etching process may also be used to create inclined sidewalls on the support post 28, and inclined first, second, third, and angled sidewalls 420, 422, 424, and 423, for the recessed area as depicted in FIG. 2. In addition to etching processes, other milling processes used in the fabrication of microdevices may also be used. Optionally, deposition processes may be used in the creation of basechip 12. Such processes maybe used to build up the support post 28, grooves 16, and mating surface 14 from the plane of the base 26.

Figure 3:
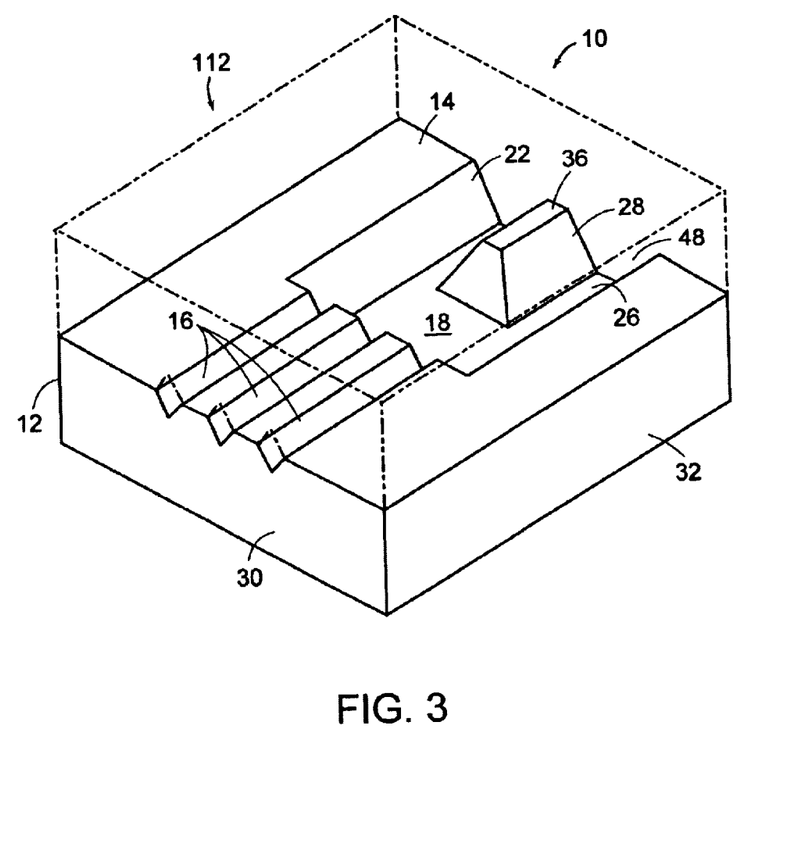
FIG. 3 schematically illustrates a perspective view of a basechip joined with a lidchip, shown in phantom for purposes of clarity, having recessed areas and grooves for retaining jacketed and un-jacketed fiber segments respectively.

In a first configuration, the fiber array 10 comprises a basechip 12 and a matching lidchip 112, as shown in phantom, as depicted in FIG. 3. The lidchip 112 is designed to mirror the configuration of the basechip 12 when the lidchip 112 is closed onto the basechip 12. The basechip 12 and lidchip 112 are disposed relative to one another so that the lidchip 112 can be closed onto the basechip 12 with their respective mating surfaces 14, 114 substantially in facing contact and with the respective grooves 16, 116 in registry with one another to form substantially diamond-shaped channels. The grooves 16, 116 are dimensioned to provide contact between the fibers and both the grooves 16 of the basechip 12 and grooves 116 of the lidchip 112. By this arrangement the corresponding upper support surfaces 36, 136 of the support posts 28, 128 are in substantially facing contact as well, as shown in FIG. 5. A thin layer of adhesive maybe present between the upper support surfaces 36, 136 and the mating surfaces 14, 114. The thin walls 34, 134 may flex slightly so that any clearance between the mating support posts 28, 128, such as clearance introduced by the gap 111 shown in FIG. 4, is substantially removed to provide the desired internal support for the recessed areas 18, 118.

The grooves 16, 116 of the conjoined basechip 12 and lidchip 112 form a plurality of channels 40 for retaining an un-jacketed segment of the fibers 46, as shown in FIG. 4. For example, the conjoined V-shaped grooves 16, 116 create channels 40 having a diamond-like cross section. Similarly, the conjoined recessed areas 18, 118 form a fiber receiving cavity for retaining the jacketed fibers 46.

The support posts 28, 128, which substantially abut at complementary upper support surfaces 36, 136, create two fiber holding channels 38 on opposite sides of the support post 28, 128 within the fiber receiving cavity, proximate the fiber receiving opening 48, for retaining one or more jacketed fibers 46, as depicted in FIG. 5. As described above, the width of the recessed areas 18, 118 is selected to correspond to the number of fibers and the width of the support posts 28, 128. Accordingly, the fiber holding channels 38 are dimensioned to have a width sufficient to retain the desired number of fibers in the array 10. In particular, to minimize the size of the fiber array 10, it is desirable that the width of the fiber holding channels 38 be a small as possible, and therefore may be matched to the size of the combined diameters of the retained jacketed fibers 46 in the array 10. Similarly, the combined height of the fiber holding channels 38 may be substantially matched to the diameter of the retained jacketed fibers 46 to minimize the height of the fiber array 10. Additional space within the fiber holding channels 38 may be provided to permit the introduction of an adhesive or potting compound to hold the fibers 46 in place.

The assembly of the fiber array 10 comprising basechip 12 and lidchip 112 begins with placement of the fibers 46 in the basechip 12 followed by attachment of the lidchip 112. The fibers 46 are prepared by removing a portion of the jacket 44 from a first end of the fibers 46 to expose the cladding 42 over a length of fiber at least as long as the length of the grooves 16. To facilitate bending of the fibers 46 about the support post 28 it is desirable that the exposed cladding extend beyond the internal ends of the grooves 16 and into the recessed area 18. However, enough of the jacket should be retained so that a sufficient length of jacketed fiber is present within the recessed area 18 to protect the fiber core from breakage. In addition, to permit closer spacing of the optical fiber cores, a portion of the cladding 42 may be removed from the ends of the fibers 46 held within the grooves 16. If a portion of the cladding 42 is removed, the spacing between the grooves 16 may be reduced.

Assembly of the fiber array 10 proceeds by placement of the prepared fibers 46 into the basechip 12. The un-jacketed core is placed in the grooves 16 with the first end of the fibers 46 proximate to the first open end of the grooves 16 at front face 30. The first end of the fibers 46 may be pre-polished or cleaved and placed flush with the front face 30 of the fiber array 10. The fibers 46 extend into the recessed area 18 with the jacketed segments of the fiber 46 disposed on either side of the support post 28 within the recessed area 18. An appropriate adhesive and/or potting compound may be used to retain the fibers 46 within the grooves 16 and the recessed area 18. An appropriate adhesive is applied to the mating surface 14 of basechip 12 and upper support surface 36 of support post 28. The mating surface 114 of lidchip 112 is placed in substantially facing engagement with and registration with the mating surface 14 of the basechip 12 to complete the assembly of the fiber array 10. Additionally, it may be desirable to polish the first end of the fibers 46 after the fiber array 10 has been assembled. In this case, the front faces 30, 130 of the joined basechip 12 and lidchip 112 may be polished to effect polishing of the first end of the fibers 46.

Figure 6:
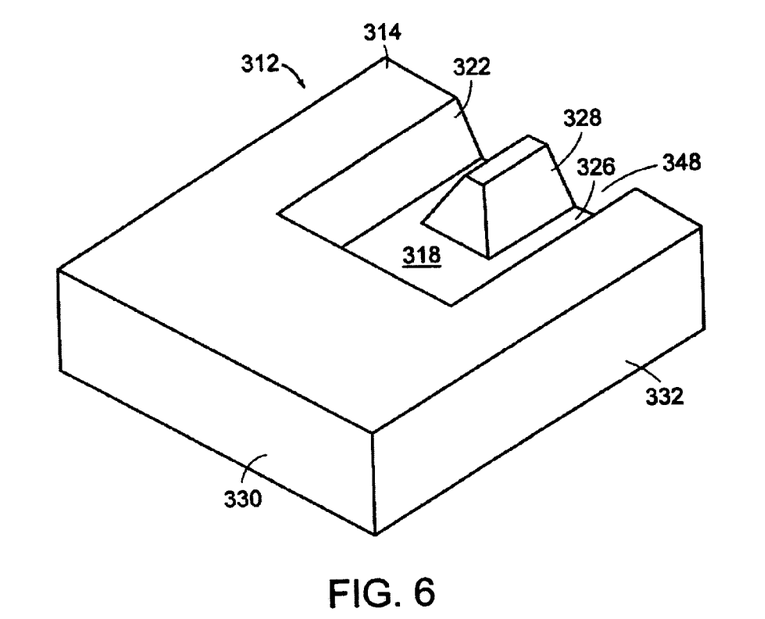
FIG. 6 schematically illustrates a perspective view of an inverted lidchip having a recessed area for retaining jacketed fibers but with no grooves.
Figure 7:
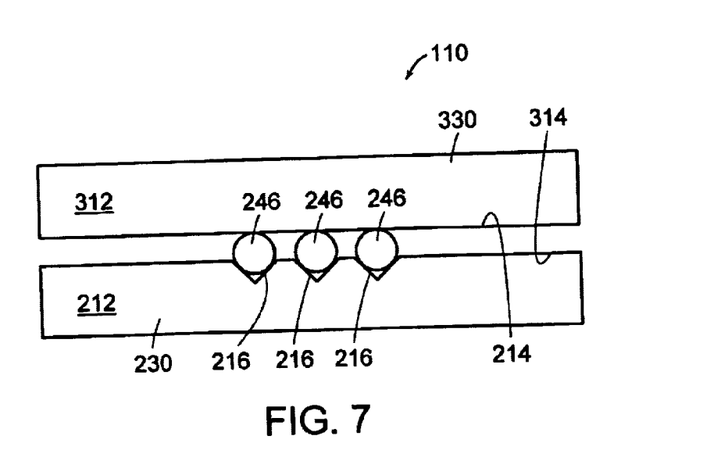
FIG. 7 schematically illustrates an end elevational view of the front faces of joined chips containing the lidchip of FIG. 6.

In another arrangement, as shown in FIGS. 6 and 7, the fiber array 110 comprises a basechip 212 and a second lidchip 312 which are similar to the basechip 12 and the lidchip 112 as shown in FIG. 1. The lidchip 312 of FIG. 6 differs from the lidchip 112 of FIG. 1 in that the lidchip 312 does not contain any grooves. When the lidchip 312 is closed onto the basechip 212, the grooves 216 of the basechip 212 may be sufficiently shallow so that the fiber segments 246 contact the lidchip 312 to permit the lidchip 312 to bias the fiber segments 246 against the surfaces of the grooves 216. Accordingly, the fibers segments 246 contained in the grooves 216 lie partially above the plane of the mating surface 214 of the basechip 212. The basechip 212 and lidchip 312 are joined and aligned in a manner similar to that described with respect to the basechip 12 and lidchip 112 of FIG. 1, with the recessed areas 218 and support posts 228 of the basechip 212 and lidchip 312 in registration. The grooves 216 of the basechip 212 mate opposite the ungrooved flat portion of the mating surface 314 of the lidchip 312.

In addition to the exemplary configurations described above, two-dimensional arrays of fibers may be provided in accordance with the present invention. Two or more arrays, such as those described above, may be stacked to form a two-dimensional array of fibers. A two-dimensional array may also be formed from a chip that includes fiber-retaining grooves on two surfaces, such as the upper surface 415 and lower surface 414 of lidchip 412 as shown in FIGS. 8–10.

Figure 8:
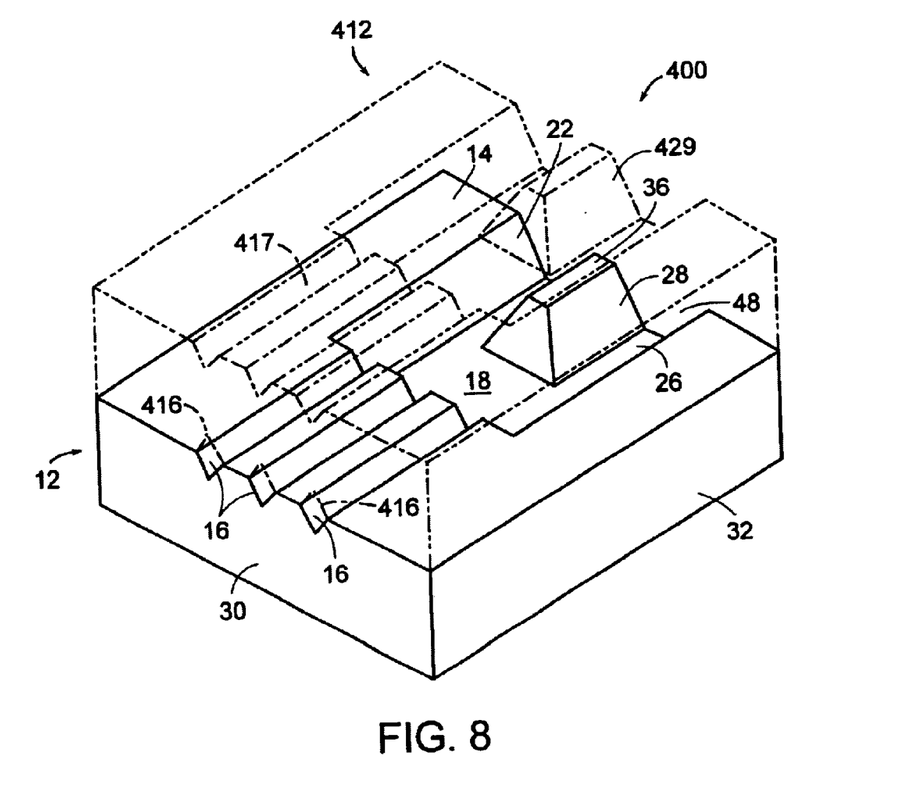
FIG. 8 schematically illustrates a perspective view of a basechip joined with a lidchip, shown in phantom for purposes of clarity, having recessed areas and grooves for retaining jacketed and unjacketed fiber segments respectively to provide a two dimensional array of fibers.
Figure 9:
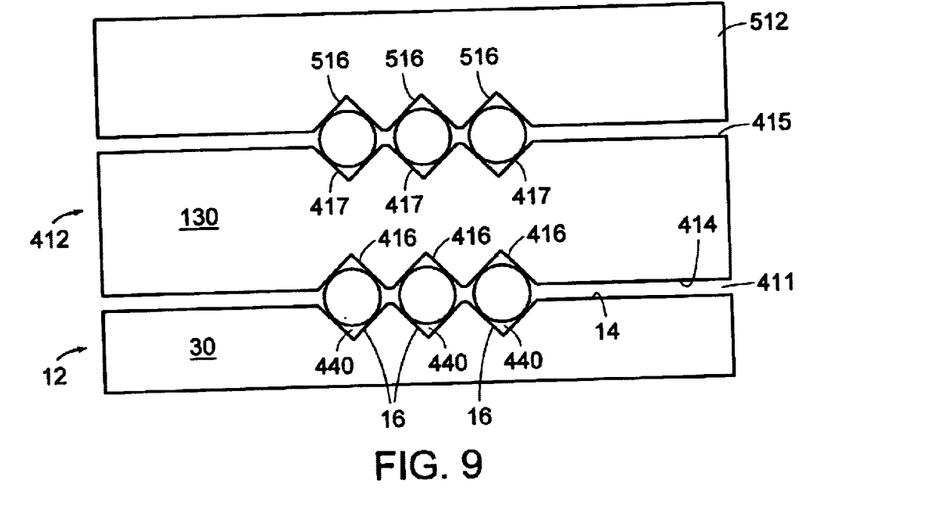
FIG. 9 schematically illustrates an end elevational view of the front faces of the joined chips of FIG. 8 along with a topchip on the lidchip.
Figure 10:
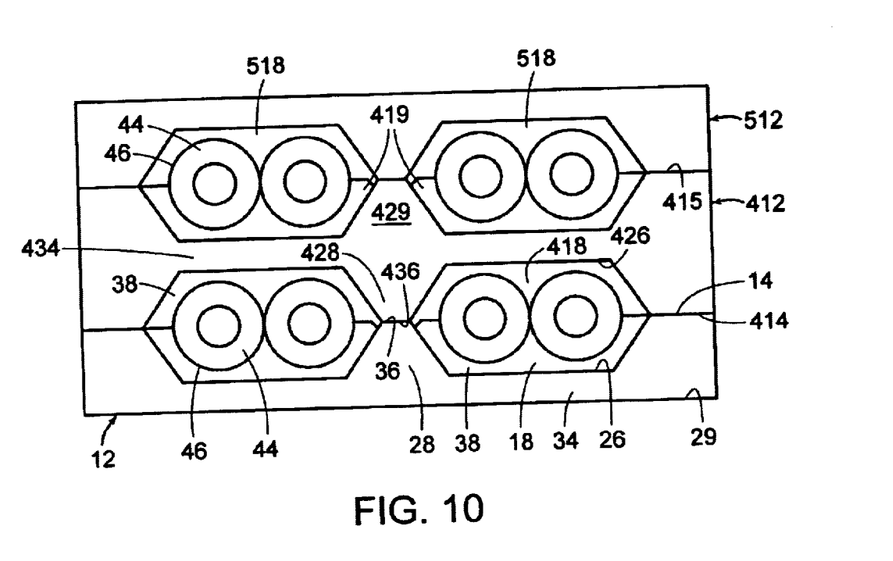
FIG. 10 schematically illustrates an end elevational view of the joined chips of FIG. 8 along with a topchip on the lidchip showing the recessed areas of the chips at the rear faces of the joined chips.

In the exemplary two-dimensional array configuration of FIGS. 8–10, the fiber array 400 comprises a basechip 12, which may be identical to the basechip 12 of FIG. 3. The fiber array 400 also comprises a matching lidchip 412, as shown in phantom in FIG. 8. The lidchip 412 is designed to mirror the configuration of the basechip 12 when the lidchip 412 is closed onto the basechip 12. In addition, the lidchip 412 differs from the lidchip 112 of FIG. 3 by at least including upper grooves 417 disposed at the upper surface 415 of the lidchip 412 and by including an upper recessed area 419 disposed at the upper surface 415 of the lidchip 412 and extending into the lidchip 412. The lidchip 412 also includes an upper support post 429 disposed within the upper recessed area 419 to provide support for the upper recessed area 419 when a topchip is mated to the upper surface 415 of the lidchip 412. The upper grooves 417 and upper recessed area 419 may be dimensioned similarly to the grooves 16 and recessed area 18 of the basechip 12 to retain optical fibers in a similar manner to the basechip 12.

The basechip 12 and lidchip 412 are disposed relative to one another so that the lidchip 412 can be closed onto the basechip 12 with their respective mating surfaces 14, 414 substantially in facing contact and with the respective basechip grooves 16 and lower lidchip groove 416 in registry with one another to form substantially diamond-shaped channels 440, as shown in FIG. 9. The basechip grooves 16 and lower lidchip grooves 416 are dimensioned to provide contact between the fibers and both the grooves 16 of the basechip 12 and the lower grooves 416 of the lidchip 412. By this arrangement the corresponding upper support surfaces 36, 436 of the support posts 28, 428 are in substantially facing contact as well, as shown in FIG. 10. A thin layer of adhesive may be present between the upper support surfaces 36, 436 and the mating surfaces 41, 414. The thin walls 34, 434 may flex slightly so that any clearance between the mating support posts 28, 428, such as clearance introduced by the gap 411 shown in FIG. 9, is substantially removed to provide the desired internal support for the recessed areas 18, 418.

The basechip grooves 16 and lower lidchip grooves 416 of the conjoined basechip 12 and lidchip 412 form a plurality of channels 440 for retaining an un-jacketed segment of the fibers 46, as shown in FIG. 9. For example, the conjoined V-shaped grooves 16, 416 create channels 440 having a diamond-like cross section. Similarly, the conjoined recessed areas 18, 418 form a fiber receiving cavity for retaining the jacketed fibers 46.

The support posts 28, 428, which substantially abut at complementary upper support surfaces 36, 436, create two fiber holding channels 38 on opposite sides of the support post 28, 428 within the fiber receiving cavity, proximate the fiber receiving opening 48, for retaining one or more jacketed fibers 46, as depicted in FIG. 10. As described above, the width of the recessed areas 18, 418 is selected to correspond to the number of fibers and the width of the support posts 28, 428. Accordingly, the fiber holding channels 38 are dimensioned to have a width sufficient to retain the desired number of fibers in the array 400. In particular, to minimize the size of the fiber array 400, it is desirable that the width of the fiber holding channels 38 be a small as possible, and therefore may be matched to the size of the combined diameters of the retained jacketed fibers 46 in the array 400. Similarly, the combined height of the fiber holding channels 38 may be substantially matched to the diameter of the retained jacketed fibers 46 to minimize the height of the fiber array 400. Additional space within the fiber holding channels 38 may be provided to permit the introduction of an adhesive or potting compound to hold the fibers 46 in place.

Additional fibers may be placed within the upper grooves 417 and upper recessed area 419 of the lidchip 412 in a manner similar to that of the basechip 12 to provide a two-dimensional array of fibers. The additional fibers may be retained at the upper surface 415 of the lidchip 412 by closing an additional lidchip, similar to lidchip 412, onto the lidchip 412. In this manner, multiple lidchips 416 may be stacked one upon another to provide multiple linear arrays of fibers stacked one upon another. A topchip 512, having no grooves or recessed area on its upper surface, may have topchip grooves 516 and a topchip recessed area 518 for registration with the upper grooves 417 and upper recessed area 519 of the lidchip 412, respectively. The topchip 512 may be closed onto the final lidchip 412, as shown in FIGS. 9 and 10, to retain the upper array of fibers to the lidchip 412. A thin layer of adhesive may be present between the opposing surfaces of the topchip 512 and lidchip 412. The top chip 512 may be substantially identical to the basechip 12.

In addition, further features may be added to the fiber arrays to facilitate handling of the fiber arrays and registration of the fiber array 10 to other optical components. For example, one or more alignment indicia may be formed in the mating surface 14 of the basechip 12 at predetermined positions and orientations with respect to the fiber-retaining grooves 16. Complementary alignment indicia may also be formed in the adjoining lidchip so that the conjoined alignment indicia form desired structures such as alignment channels. The alignment channels may extend into the front face of the array and have dimensions sufficient to receive an alignment pin, for example, associated with a device to which the fiber array is to be aligned. For example, the alignment grooves may have a V-shaped cross section and a larger width than the fiber-retaining grooves 16. Additionally, the outer surface of the fiber array may have a beveled edge on the exterior surface to facilitate alignment of the array to other devices. For example, the beveled edge may extend along the direction of the longitudinal axis of the fiber-retaining grooves 16.

In addition, the fiber array 10 may contain features designed to facilitate handling of the fiber array 10. For example, handling channels may extend into the basechip 12 from the bottom surface 29 of the basechip 12. Such handling channels may have a V-shaped cross section. In a particular configuration, two handling channels may be provided along a colinear path, for example, in the basechip in an orientation transverse to the grooves 16, with one channel extending from the bottom surface 29 toward grooves 16 so that an interior end of the channel intersects a first outer groove of the array of grooves 16 that is most proximate sidewall 32. The second handling channel extends form the bottom surface 29 so that the interior end of the second handling channel intersects a second outer groove which is located furthest from the first outer groove. Thus, the handling channels provide passageways from the exterior of the fiber array 10 to the two outside grooves of the array 10. Such passageways permit visual location of the fibers located within the two outermost grooves.

It will be recognized by those skilled in the art that changes or modifications may be made to the above-described embodiments without departing from the broad inventive concepts of the invention. For example, the front faces 30, 130 of the basechip 12 and lidchip 112 may be inclined with respect to the plane of the mating surface 14 rather than perpendicular to the mating surface 14. Such a configuration may be desirable to accommodate fibers whose end faces are polished at an angle with respect to the optical axis of the fiber. It should therefore be understood that this invention is not limited to the particular embodiments described herein, but is intended to include all changes and modifications that are within the scope and spirit of the invention as set forth in the claims.

What is claimed is:

1. A fiber array for holding a plurality of optical fibers comprising:

A. a basechip comprising:
   (a) a front face and a rear face;
   (b) a first mating surface having a plurality of generally parallel grooves formed therein for receiving first selected portions of the optical fibers, the grooves extending parallel to a longitudinal axis and having first and second open ends, the first open ends being positioned at the front face of the basechip;
   (c) a first recessed area for receiving second selected portions of the optical fibers extending down into the basechip from the first mating surface in position to adjoin the second open ends of the grooves and to provide an access opening at the rear face, the recessed area including a first sidewall oriented generally transverse to the longitudinal axis adjoining the second open ends of the grooves, a second and third opposing sidewalls extending away from the first sidewall, and a base at the bottom of the first, second and third sidewalls extending from the first sidewall to the rear face; and
   (d) at least one support post upwardly extending from the base within the first recessed area, the support post having an upper support surface located at the first mating surface;

B. a lidchip comprising:
   a) a bottom mating surface for communication with the first mating surface;
   b) a complementary recessed area extending into the lidchip for registration with the first recessed area for holding the second selected portions of the optical fibers; and
   c) at least one complementary support post positioned within the complementary recessed area and the lidchip for engagement with the support post of the basechip, the complementary support post having a mating support surface located at the bottom mating surface, the mating support surface for facing engagement with the upper support surface to provide support within the joined first recessed area and the complimentary recessed area.

2. The fiber array of claim 1 wherein the second selected portion of the optical fibers include a jacketed core segment and the first selected portions of the optical fibers including adjoining un-jacketed core segments, the unjacketed core segments being disposed within the grooves and the jacketed segments being disposed within the joined recessed areas.

3. The fiber array according to claim 1 wherein the grooves are configured to retain cores of the optical fibers in predetermined positions.

4. The fiber array according to claim 1 wherein the grooves have sidewalls that are inclined with respect to the mating surface.

5. The fiber array according to claim 1 wherein the grooves have V-shaped cross sections.

6. The fiber array according to claim 1 wherein the grooves have U-shaped cross sections.

7. The fiber array according to claim 1 wherein the bottom mating surface is adapted to communicate with the first selected portions of the optical fibers.

8. The fiber array according to claim 1 wherein the ends of the optical fibers are located proximate to the first open ends of the grooves.

9. The fiber array according to claim 1 wherein the fibers include cores surrounded by outer jackets and wherein the recessed areas are configured to retain the jackets of the optical fibers in position.

10. The fiber array according to claim 9 wherein the recessed area adjoins the complementary recessed area to form a cavity for holding the outer jackets of the optical fibers in place.

11. The fiber array according to claim 10 wherein the height of the cavity is substantially matched to the jacket diameter.

12. The fiber array according to claim 1 wherein the support post is positioned intermediate the second and third sidewalls and wherein the support post and the complementary support post provide a fiber holding channel disposed between the support post and the second sidewall for holding at least two optical fibers.

13. The fiber array according to claim 1 wherein the support post and the complementary support post provide a fiber holding channel disposed between the support post and the third sidewall for holding at least two optical fibers.

14. The fiber array according to claim 1 wherein the recessed area comprises an open end face at the rear face and wherein the support post is disposed proximate to the open endface.

15. The fiber array according to claim 1 wherein the support post is disposed sufficiently away from the first sidewall to permit bending of the fibers about the support post and alignment with the grooves.

16. The fiber array according to claim 1 wherein the basechip comprises silicon.

17. The fiber array according to claim 1 wherein the basechip and the lidchip are affixed to one another by an adhesive.

18. The fiber array according to claim 1 wherein the lidchip comprises a plurality of grooves in the bottom mating surface disposed for registration with the plurality of grooves in the basechip to form an array of fiber passages when the lidchip is closed onto the basechip.

19. The fiber array according to claim 18 wherein optical fibers include a core surrounded by a cladding and wherein the fiber passages are configured to retain the clad cores of the optical fibers in position between the lidchip and the basechip.

20. The fiber array according to claim 18 wherein the grooves of the basechip and the lidchip have sidewalls that are inclined with respect to the respective first and bottom mating surfaces of the basechip and the lidchip.

21. The fiber array according to claim 18 wherein the respective grooves of the basechip and the lidchip have V-shaped cross sections.

22. The fiber array according to claim 18 wherein the grooves have U-shaped cross sections.

23. The fiber array according to claim 18 wherein the lidchip comprises an upper mating surface, the upper mating surface comprising a plurality of upper grooves for receiving first selected portions of the optical fibers and comprising an upper recessed area extending into the lidchip for holding second selected portions of the optical fibers.

24. The fiber array according to claim 23 wherein the lidchip comprises an upper support post disposed within the upper recessed area.

25. The lidchip of claim 1 wherein the recessed area includes angled sidewalls adjoining the first sidewall to the second and third sidewalls respectively.

26. A fiber array for holding a plurality of optical fibers having a core surrounded by a cladding covered by a jacket comprising:
    first and second face walls, the second face wall having a fiber receiving opening;
    an upper surface extending from a top edge of the first face wall to a top edge of the second face wall to form a top surface of the fiber array, and a lower surface extending from a bottom edge of the first face wall to a bottom edge of the second face wall to form a bottom surface of the fiber array;
    a fiber receiving cavity disposed between the top and bottom surfaces of the fiber array and communicating with the fiber receiving opening, the cavity comprising top and bottom interior walls proximate to the respective top and bottom surfaces;
    a plurality of fiber passageways having first ends disposed at the first face wall to communicate with the exterior of the fiber array and having second ends in communication with the fiber receiving cavity;
    a support post disposed within the fiber receiving cavity and extending from the top interior wall to the bottom interior wall and forming channels on each side of the support post;
    a plurality of optical fibers each having an un-jacketed core segment at a first end of the optical fiber and an adjoining jacketed segment, the un-jacketed core segment disposed within a respective one of the fiber passageways with the first end of the optical fiber proximate to the first face wall of the fiber array, and the jacketed segment disposed within the fiber receiving cavity.

27. The fiber array according to claim 26 wherein the passageways are configured to retain the cores of the optical fibers in predetermined positions.

28. The fiber array according to claim 26 wherein the passageways have V-shaped cross sections.

29. The fiber array according to claim 26 wherein the passageways have diamond-shaped cross sections.

30. The fiber array according to claim 26 wherein the passageways are spaced apart from each other in the transverse direction.

31. The fiber array according to claim 26 wherein the passageways have U-shaped cross sections.

32. The fiber array according to claim 26 wherein the upper surface comprises a plurality of grooves adapted to receive un-jacketed core segments of the optical fibers and wherein the upper surface comprises a recessed area extending into the lidchip and communicating with the grooves, the recessed area adapted to receive jacketed segments of the optical fibers.

33. The fiber array according to claim 32 wherein the recessed area comprises an upper support post.

34. The fiber array according to claim 26 wherein the fiber receiving cavity is configured to retain the jackets of the optical fibers in place.

35. The fiber array according to claim 26 wherein the distance between the top interior wall and the bottom interior wall is substantially matched to the diameter of the jackets.

36. The fiber array according to claim 26 comprising a first cavity channel disposed between the support post and the first end wall and a second cavity channel disposed between the support post and the second end wall.

37. The fiber array according to claim 36 wherein the first cavity channel is sized to hold at least two optical fibers in a side by side manner.

38. The fiber array according to claim 37 wherein the second cavity channel is sized to hold at least two optical fibers in a side by side manner.

39. The fiber array according to claim 24 wherein the support post is disposed proximate to the fiber receiving opening.

40. The fiber array according to claim 26 wherein the support post is disposed sufficiently away from the second ends of the passageways to permit bending of the fibers about the support post and alignment of the fibers with the passageways.

41. The fiber array according to claim 26 wherein the support post provides sufficient support to permit thickness between the top surface and the top interior wall and thickness between the bottom surface and the bottom interior wall to be minimized.

42. The fiber array according to claim 26 comprising a second support post disposed within the fiber receiving cavity and extending from the top interior wall to the bottom interior wall.

43. The fiber array according to claim 26 wherein the fiber array comprises silicon.

44. The fiber array according to claim 26 wherein the first face wall is inclined at an angle with respect to a longitudinal axis of the passageways.

45. A basechip of fiber array comprising:
    A. a front face and a rear face;
    B. a top mating surface having a plurality of grooves formed therein, the grooves extending along a longitudinal axis and having first and second open ends, the first open ends being proximate to the front face of the basechip;
    C. a first recessed area extending downward into the basechip from the mating surface a deeper distance than that of the grooves, the recessed area having first, second, and third sidewalls and a base surface adjoining lower edges of the first, second, and third sidewalls, the first sidewall adjoining the second open ends of the grooves, the second and third sidewalls extending away from the first sidewall toward the rear face; and D. at least one support post extending upwardly from the base surface towards the mating surface, the support post having an upper support surface.

46. A basechip for use with an array of optical fibers wherein the optical fibers have large-width sections of a predetermined width and adjoining small-width sections of relatively smaller width comprising:

A. a grooved support section disposed at an end of the basechip providing a series of grooves dimensioned to receive the small-width sections of the fibers and to hold the small-width sections between an enclosing lidchip;

B. an enlarged recessed area adjoining the grooved support section dimensioned to receive the large-width sections of the optical fibers and to hold the large-width sections between the enclosing lidchip; and C. a support post disposed within the recessed area to provide support within the recessed area relative to the lidchip, the support post providing passageway channels within the recessed area on opposite sides of the support post for holding the large-width sections of the optical fibers.

47. A support chip for use with an array of optical fibers wherein the optical fibers have large-width sections of a predetermined width and adjoining small-width sections of relatively smaller width comprising:

A. a basechip including:
(i) a grooved support section disposed at the end of the basechip providing a series of grooves dimensioned to receive the small-width sections of the fibers;
(ii) an enlarged recessed area adjoining the grooved support section dimensioned to receive the large-width sections of the optical fibers;

B. a lidchip for enclosing the grooved support section and the enlarged recessed area of the basechip to hold the small-width sections of fibers within the grooved support section and to hold the large-width sections of the fibers within the enlarged recessed area; and C. a support post disposed within the recessed area to provide support within the recessed area between the basechip and the lidchip.

48. The support chip of claim 47 wherein the support post is disposed within the recessed area to provide passageway channels within the recessed area on opposite sides of the support post for holding the large-width sections of the optical fibers.

49. The support chip of claim 48 wherein each passageway channel is dimensioned to receive at least two optical fibers in side-by-side configuration.

50. The support chip of claim 48 wherein the support post is provided on the basechip.

51. The support chip of claim 47 wherein the support post includes a support post section provided on the basechip and a support post section provided on the lidchip in position to register with one another to provide support within the recessed area of the basechip.

52. The support chip of claim 47 wherein the lidchip includes a recessed area that aligns with the basechip to form a cavity for receiving the large-width sections of the optical fibers.

53. The support chip of claim 47 wherein the lidchip includes a grooved section providing a series of grooves dimensioned to a line with the grooves of the basechip for holding the small-width sections of the fibers.

54. The support chip of claim 47 wherein the lidchip includes a recessed area that aligns with the recessed area of the basechip and a grooved section providing a series of grooves dimensioned to align with the grooves of the basechip wherein the aligned grooves are dimensioned to receive and hold the small-width sections of the fibers, and the aligned recessed areas are dimensioned to hold the large-width sections of the optical fibers.

55. The support chip of claim 54 wherein the support post includes a support post section disposed within the recessed area of the basechip and a second support section disposed within the recessed area of the lidchip in position so that the support post sections align to provide the support in the recessed areas of the basechip and the lidchip.

56. The support chip of claim 55 wherein the lidchip comprises an upper grooved support section for receiving the small-width sections of the optical fibers and the lidchip comprises an upper enlarged recessed area adjoining the upper grooved support section dimensioned to receive the large-width sections of the optical fibers.

57. The support chip of claim 56 wherein lidchip comprises an upper support post disposed within the upper enlarged recessed area.

58. The support chip of claim 56 comprising a topchip for enclosing the upper grooved support section and the upper enlarged recessed area of the lidchip to hold the small-width sections of fibers within the upper grooved support section and to hold the large-width sections of the fibers within the enlarged recessed area.

59. The support chip of claim 47 wherein the lidchip includes an ungrooved support section to hold the small-width sections of the optical fibers within the series of grooves within the basechip.

60. The support chip of claim 59 including a recessed area adjoining the ungrooved section of the lidchip in position to register with the recessed area of the basechip to form an enlarged cavity for receiving and holding the large width sections of the optical fibers.

61. The support chip of claim 60 wherein the support post includes a support post section within the lidchip and a mating support post section with the lidchip for combining to form the support post for supporting the cavity between the lidchip and the basechip.

* * * * *